United States Patent
Kobayashi

(10) Patent No.: US 9,126,456 B2
(45) Date of Patent: Sep. 8, 2015

(54) PNEUMATIC TIRE

(75) Inventor: Hironori Kobayashi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/238,180

(22) PCT Filed: Aug. 12, 2011

(86) PCT No.: PCT/JP2011/068450
§ 371 (c)(1),
(2), (4) Date: Feb. 10, 2014

(87) PCT Pub. No.: WO2013/024516
PCT Pub. Date: Feb. 21, 2013

(65) Prior Publication Data
US 2014/0196826 A1   Jul. 17, 2014

(51) Int. Cl.
*B60C 9/22* (2006.01)
*B60C 11/00* (2006.01)
*B60C 3/00* (2006.01)
*B60C 9/18* (2006.01)
*B60C 11/03* (2006.01)
*B60C 9/20* (2006.01)
*B60C 9/28* (2006.01)
*B60C 11/04* (2006.01)

(52) U.S. Cl.
CPC ............... *B60C 9/18* (2013.01); *B60C 9/2006* (2013.01); *B60C 9/28* (2013.01); *B60C 11/0332* (2013.01); *B60C 11/04* (2013.01); *B60C 2009/2257* (2013.01); *B60C 2009/2266* (2013.01); *B60C 2200/02* (2013.01)

(58) Field of Classification Search
CPC ............. B60C 3/00; B60C 9/18; B60C 9/22; B60C 11/00
See application file for complete search history.

(56) References Cited

U.S. PATENT DOCUMENTS

| | | | | |
|---|---|---|---|---|
| 4,688,615 | A | * | 8/1987 | Lee ................ 152/531 |
| 6,116,311 | A | * | 9/2000 | Ueyoko et al. ............ 152/531 |
| 2007/0137748 | A1 | | 6/2007 | Itai |
| 2008/0277037 | A1 | | 11/2008 | Yano |
| 2010/0051153 | A1 | | 3/2010 | Kojima et al. |

FOREIGN PATENT DOCUMENTS

| | | | |
|---|---|---|---|
| DE | 10 2009 033 609 A1 | | 3/2010 |
| EP | 554108 | * | 8/1993 |
| JP | S64-083407 | | 3/1989 |
| JP | 2004-001609 | | 1/2004 |

(Continued)

OTHER PUBLICATIONS

International Search Report dated Oct. 25, 2011, 2 pages, Japan.

*Primary Examiner* — Justin Fischer
(74) *Attorney, Agent, or Firm* — Thorpe North & Western

(57) ABSTRACT

This pneumatic tire includes a belt layer including a pair of cross belts and a circumferential reinforcing layer disposed between the cross belts or disposed inward in the tire radial direction of the cross belts and that comprises a steel wire wound spirally at a slant within a ±5° range with respect to a tire circumferential direction, and a tread portion disposed outward in the tire radial direction of the belt layer and that contacts a road surface. The circumferential reinforcing layer has a width in the tire width direction that is not less than 60% and not more than 85% of a maximum ground contact width in the tire width direction of the ground contact patch of the tread portion.

19 Claims, 5 Drawing Sheets

(56) References Cited

FOREIGN PATENT DOCUMENTS

| JP | 2007-168578 | 7/2007 |
| JP | 2010-76744 | * 4/2010 |
| JP | 4635010 | 2/2011 |
| WO | WO 2011/065018 | 6/2011 |

* cited by examiner

PNEUMATIC TIRE

TECHNICAL FIELD

The present invention relates to a pneumatic tire.

BACKGROUND

Conventional pneumatic tires have a reinforcing layer in a belt layer in order to improve the tire durability. The technologies described in Japanese Unexamined Patent Application Publication No. 2007-168578A and Japanese Patent No. 4635010 are conventional pneumatic tires using such a configuration.

The pneumatic tires described in Japanese Unexamined Patent Application Publication No. 2007-168578A and Japanese Patent No. 4635010 are mainly used in aircraft. However, in recent years, pneumatic tires that provide a circumferential reinforcing layer having a cord disposed in the circumferential direction have also been proposed for other uses. Here, providing a circumferential reinforcing layer in the pneumatic tire enables durability to be improved a fixed degree but may produce uneven wear and the like. A problem is that when uneven wear occurs, durability is reduced.

SUMMARY

The present technology provides a pneumatic tire whereby tire durability can be improved. To achieve the above object, a pneumatic tire according to this invention includes a belt layer including a pair of cross belts and a circumferential reinforcing layer disposed between the cross belts or disposed inward in the tire radial direction of the cross belts and that comprises a steel wire wound spirally at a slant within a ±5° range with respect to a tire circumferential direction, and a tread portion disposed outward in the tire radial direction of the belt layer and that contacts a road surface; wherein when assembled on a regular rim, inflated to a maximum air pressure of a regular inner pressure, provided with a camber angle of 0°, and subjected to 100% of a regular load, a form of a ground contact patch of the tread portion is such that $0.9 \le LZ/LC \le 1.0$, where LC is a ground contact length in the tire circumferential direction on a tire equatorial plane and LZ is a ground contact length in the tire circumferential direction of an edge in a tire width direction of the circumferential reinforcing layer; and the circumferential reinforcing layer has a width in the tire width direction that is not less than 60% and not more than 85% of a maximum ground contact width in the tire width direction of the ground contact patch of the tread portion.

Further, a form of the ground contact patch of the tread portion is preferably such that $0.85 \le L90/LC \le 1.0$, where L90 is a ground contact length in the tire circumferential direction at a location where the ground contact length is 90% of the maximum ground contact width in the tire width direction, from the tire equatorial plane.

Further, the form of the ground contact patch of the tread portion is preferably such that $0.90 \le L50/LC \le 1.0$, where L50 is a ground contact length in the tire circumferential direction at a location where the ground contact length is 50% of the maximum ground contact width in the tire width direction, from the tire equatorial plane.

Further, the form of the ground contact patch of the tread portion is preferably such that $0.95 \le L98/L90 \le 1.05$, where L90 is a ground contact length in the tire circumferential direction at a location where the ground contact length is 90% of the maximum ground contact width in the tire width direction, from the tire equatorial plane; and L98 is a ground contact length in the tire circumferential direction at a location where the ground contact length is 98% of the maximum ground contact width in the tire width direction, from the tire equatorial plane.

Further, the circumferential reinforcing layer of the belt layer is preferably disposed between the pair of cross belts.

Further, a nominal aspect ratio of the tire is preferably not more than 70.

Further, the steel wire is preferably disposed with an end count of not less than 17 wires/50 mm and not more than 30 wires/50 mm.

Further, a diameter of the steel wire is preferably within a range of not less than 1.2 mm and not more than 2.2 mm.

This pneumatic tire can suppress damage of the circumferential reinforcing layer by appropriate load applied to the circumferential reinforcing layer as well as suppress uneven wear while improving durability of a tire.

DETAILED DESCRIPTION

The present invention is described below in detail with reference to the accompanying drawings. However, the present invention is not limited to these embodiments. Moreover, constituents which can possibly or obviously be substituted while maintaining consistency with the present invention are included in constitutions of the embodiments.

Pneumatic Tire

Figure 1:
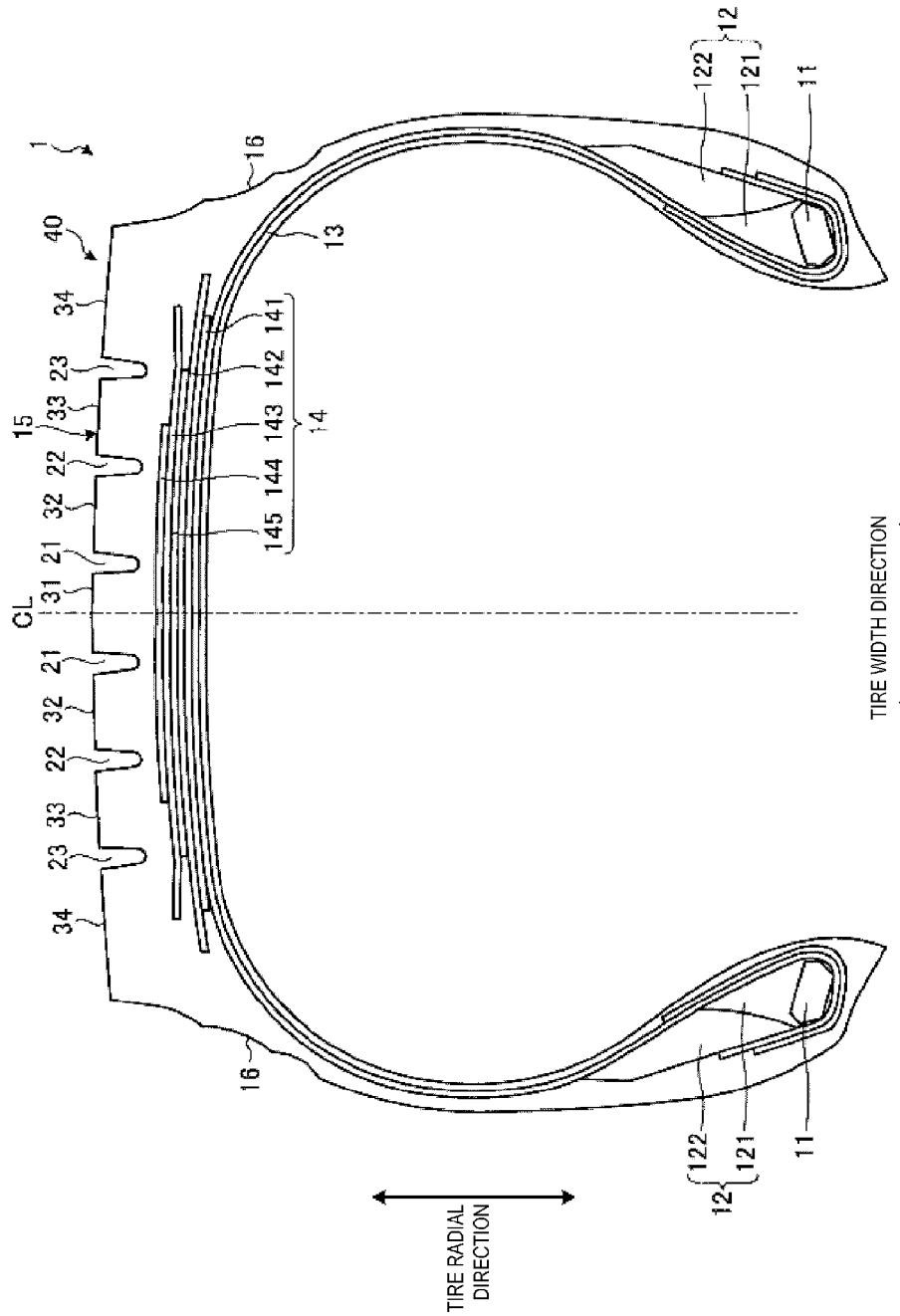
FIG. 1 is a cross-sectional view in a tire meridian direction illustrating a pneumatic tire according to an embodiment of the present invention.
Figure 2:
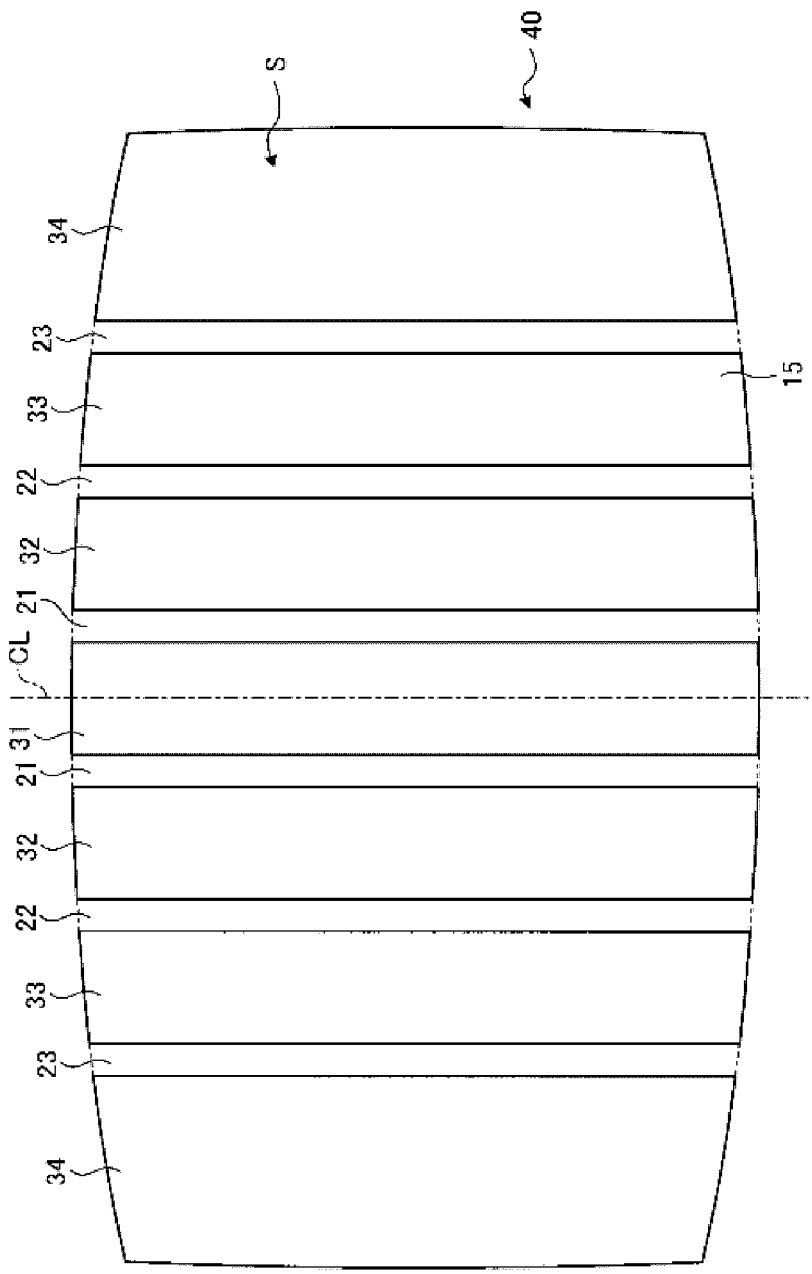
FIG. 2 is an explanatory view illustrating a form of the ground contact patch of the pneumatic tire depicted in FIG. 1.
Figure 3:
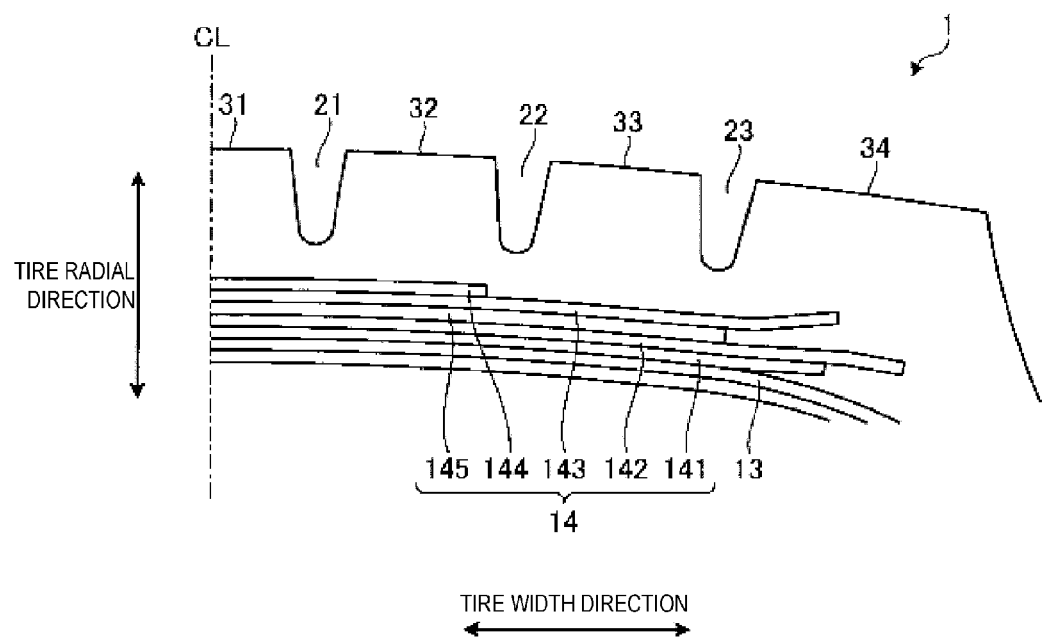
FIG. 3 is an explanatory view illustrating a belt layer of the pneumatic tire depicted in FIG. 1.
Figure 4:
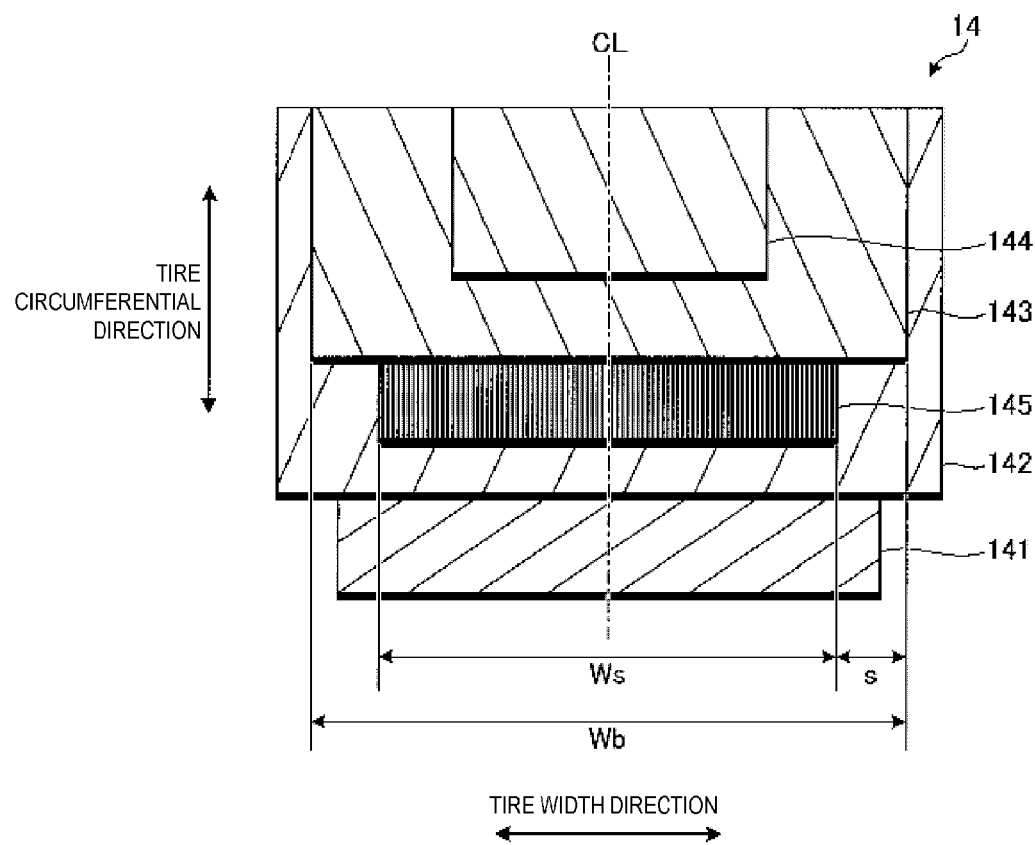
FIG. 4 is an explanatory view illustrating a belt layer of the pneumatic tire depicted in FIG. 1.
Figure 5:
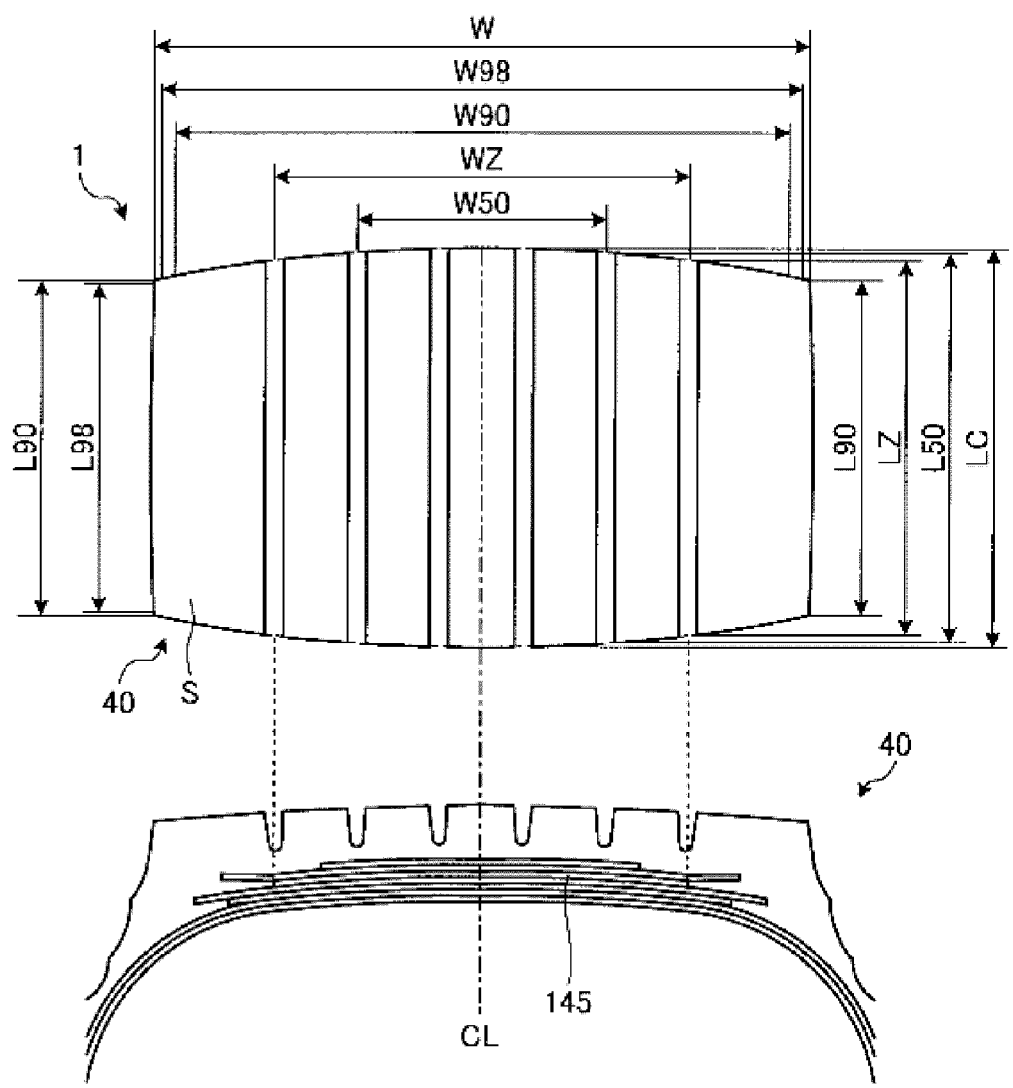
FIG. 5 is an explanatory view illustrating a relationship between a belt layer and the ground contact patch of the pneumatic tire depicted in FIG. 1.

FIG. 1 is a cross-sectional view in a tire meridian direction illustrating a pneumatic tire according to an embodiment of the present invention. FIG. 2 is an explanatory view illustrating a form of the ground contact patch of the pneumatic tire depicted in FIG. 1. FIG. 3 is an explanatory view illustrating a belt layer of the pneumatic tire depicted in FIG. 1. FIG. 4 is an explanatory view illustrating the belt layer of the pneumatic tire depicted in FIG. 1. FIG. 5 is an explanatory view illustrating a relationship between a belt layer and the ground contact patch of the pneumatic tire depicted in FIG. 1. In the following description, "tire radial direction" refers to a direction orthogonal to the rotational axis (not shown) of the pneumatic tire 1; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between constituents located to the outside in the tire width direction, or in other words, the distance between the constituents that are most distant in the tire width direction from the tire equatorial plane CL. "Tire equator line" refers to a line along the tire circumferential direction of the pneumatic tire 1 that lies on the tire equatorial plane CL. In this embodiment, "tire equator line" is given the same "CL" reference symbol as that used for the tire equatorial plane. Further, in this embodiment, a description is given for a case of mounting pneumatic tires as heavy duty radial tires on a truck, bus, or the like for the purpose of long distance transport.

As illustrated in FIG. 1, a pneumatic tire 1 includes a pair of bead cores 11, a pair of bead fillers 12, a carcass layer 13, a belt layer 14, tread rubber 15, and a pair of side wall rubbers 16. The pair of bead cores 11 have annular structures and constitute cores of left and right bead portions. The pair of bead fillers 12 are formed from a lower filler 121 and an upper filler 122, and are disposed on a periphery of each of the pair of bead cores 11 in the tire radial direction so as to reinforce the bead portions. The carcass layer 13 has a single-layer structure, and stretches between the left and right bead cores 11 in toroidal form, forming a framework for the tire. Additionally, both ends of the carcass layer 13 are folded toward an outer side in the tire width direction so as to envelop the bead cores 11 and the bead fillers 12, and fixed. The belt layer 14 is made of a laminated large angle belt 141, a pair of cross belts 142 and 143, a belt cover 144, and a circumferential reinforcing layer 145, and the belt layer 14 is disposed on the outer periphery in the tire radial direction of the carcass layer 13. The belt layer 14 is described below. The tread rubber 15 is disposed on the periphery of the carcass layer 13 and the belt layer 14 in the tire radial direction, and forms a tire tread 40. The pair of side wall rubbers 16 is disposed on each outer side of the carcass layer 13 in the tire width direction so as to form left and right side wall portions of the tire. In this embodiment, the pneumatic tire 1 has a left-right symmetric construction centered on a tire equatorial plane CL.

Further, the pneumatic tire 1, as illustrated in FIG. 1 and FIG. 2, includes a plurality of two circumferential main grooves 21, two circumferential main grooves 22, and two circumferential main grooves 23 extending in a tire circumferential direction on the tread portion 40. The pneumatic tire 1 of this embodiment is formed in the order of the circumferential main grooves 21, the circumferential main grooves 22, and the circumferential main grooves 23 from the tire equatorial plane CL toward the outer side of the tire width direction. In addition, the tread rubber 15 of the tread portion 40 is partitioned by the circumferential main grooves 21, 22, and 23 and divided into a plurality of land portions 31, 32, 33, and 34. The land portion 31 is the region interposed between the two circumferential main grooves 21. The two land portions 32 are regions interposed respectively between the circumferential main grooves 21 and the circumferential main grooves 22. The two land portions 33 are regions interposed respectively between the circumferential main grooves 22 and circumferential main grooves 23. The two land portions 34 are regions outward in the tire width direction of the circumferential main grooves 23. The pneumatic tire 1 composes a ground contact patch in this manner by a surface that contacts with a road surface of a tread portion 40 configured of the plurality of circumferential main grooves 21, 22, and 23 and a plurality of land portions 31, 32, 33, and 34.

As illustrated in FIG. 3 and FIG. 4, the belt layer 14 is formed by laminating a large angle belt 141, a pair of cross belts 142, 143, a belt cover 144, and a circumferential reinforcing layer 145, disposed on the periphery of the carcass layer 13.

The large angle belt 141 is configured by a plurality of belt cords formed from steel or organic fibers, covered by coating rubber, and subjected to a rolling process, having a belt angle (angle of inclination of belt cord fiber direction with respect to the tire circumferential direction), as an absolute value, of not less than 40° and not more than 60°. Also, the large angle belt 141 is disposed so as to be laminated outward in the tire radial direction of the carcass layer 13.

The pair of cross belts 142, 143 are configured by a plurality of belt cords formed from steel or organic fibers, covered by coating rubber, and subjected to a rolling process, having a belt angle, as an absolute value, of not less than 10° and not more than 30°. Additionally, the pair of cross belts 142, 143 have belt angles that are of mutually opposite sign to each other, and are laminated so that the fiber directions of the belt cords intersect each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed so as to be laminated (not illustrated in the drawings). Also, the pair of cross belts 142, 143 are disposed so as to be laminated outward in the tire radial direction of the large angle belt 141.

The belt cover 144 is configured by a plurality of belt cords formed from steel or organic fibers, covered by coating rubber, and subjected to a rolling process, having a belt angle, as an absolute value, of not less than 10° and not more than 45°. Also, the belt cover 144 is disposed so as to be laminated outward in the tire radial direction of the cross belts 142, 143. In this embodiment, the belt cover 144 has the same belt angle as the outer-side cross belt 143, and, is disposed in the outermost layer of the belt layer 14.

The circumferential reinforcing layer 145 is constituted from steel wires, and has a configuration in which at least one wire that is wound spirally at a slant within a range of ±5° with respect to the tire circumferential direction. Also, the circumferential reinforcing layer 145 is disposed so as to be interposed between the pair of cross belts 142, 143. Also, the circumferential reinforcing layer 145 is disposed inward in the tire width direction of left and right edges of the pair of cross belts 142, 143. Specifically, a wire is wound spirally around the periphery of the inner-side cross belt 142 to form the circumferential reinforcing layer 145. This circumferential reinforcing layer 145 reinforces the stiffness in the tire circumferential direction. As a result, the durability of the tire is improved.

The belt layer 14 may have an edge cover (not illustrated in the drawings). Generally, the edge cover is configured by a plurality of belt cords formed from steel or organic fibers, covered by coating rubber, and subjected to a rolling process, having a belt angle of within a range of ±5° with respect to the tire circumferential direction. Also, the edge cover is disposed outward in the tire radial direction of the left and right edges of the outer-side cross belt 143 (or the inner-side cross belt 142). As a result of the fastening effect of the edge cover, the difference in radial growth of a tread center region and a shoulder region is reduced, and uneven wear resistance performance of the tire is improved.

In the pneumatic tire 1 of this embodiment, the circumferential reinforcing layer 145 is configured by winding a single steel wire in a spiral manner. However, the pneumatic tire 1 is not limited to this configuration. The pneumatic tire 1 may have a configuration in which the circumferential reinforcing layer 145 is formed by running a plurality of wires together and winding in a spiral manner, which is to say, the pneumatic tire 1 may have a multiplexed wound structure. In the pneumatic tire 1, the circumferential reinforcing layer 145 preferably has not more than five wires. Further, when the circumferential reinforcing layer 145 is multiplexed-wound using multiple wires of not more than five wires, the winding width per wire turn is preferably not more than 12 mm. In this way, the circumferential reinforcing layer 145 can have a plurality (not less than two and not more than five) of wires wound properly at a slant within a range of ±5° with respect to the tire circumferential direction.

Next, a description will be given using FIG. 5 of a relative positional relation between the tread portion 40 and the circumferential reinforcing layer 145. Note that the tread portion 40 of the pneumatic tire 1 illustrated in FIG. 5 is a form of a portion that makes the ground contact patch S, when the pneumatic tire 1 is assembled on a regular rim, inflated to a maximum air pressure of a regular inner pressure, provided with a camber angle of 0°, and subjected to 100% of a regular load. Further, the form of the ground contact patch S is a form in the case where the pneumatic tire 1 is in an unused state.

Here, "Regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, when the pneumatic tire is a tire of a passenger vehicle used in accordance with JATMA stipulations, the regular internal pressure is in air pressure of 180 kPa, and the stipulated load is 88% of a maximum load capacity.

The form of the ground contact patch S formed by the conditions given above of the tread portion 40 is such that $0.9 \leq LZ/LC \leq 1.0$, where LC is a ground contact length in the tire circumferential direction on a tire equatorial plane and LZ is a ground contact length in the tire circumferential direction of an edge (location that becomes the edge portion of WZ in the drawing) in a tire width direction of the circumferential reinforcing layer. In other words, the ground contact patch of the above conditions of the tread portion 40 becomes a form that satisfies the relationship of $0.9 \leq LZ/LC \leq 1.0$. Here, when the location that makes up the contact length LC and the contact length LZ overlaps with the circumferential main groove, a line where the edge portion (the edge of the tire circumferential direction of a first wall face) of the circumferential main groove in the ground contact patch S linearly connected to an edge portion (the edge of the tire circumferential direction of a second wall face) becomes the edge portion in the tire radial direction of the ground contact patch.

The pneumatic tire, by LZ and LC of the tread portion 40 satisfying such that $0.9 \leq LZ/LC \leq 1.0$, can suppress uneven wear and can also suppress wire damage. Specifically, when LZ/LC is not less than 0.9, application of excessive tension on the wire of the circumferential reinforcing layer can be suppressed and metal fatigue of the wire can be reduced. More specifically, the difference in diameter in the tire radial direction between the tire equatorial plane and the edge portion of the tire width direction of the circumferential reinforcing layer can be smaller in the pneumatic tire 1 when LZ/LC is not less than 0.9. In this way, deformation that tries to eliminate the difference in diameter in the tire radial direction that occurs in the portion where the contact length of the ground contact patch is short can be made even smaller. In this way, an increase in wire tension generated by extending in the circumferential direction can be suppressed, metal fatigue can be reduced, and generation of fatigue failures can be suppressed in the pneumatic tire even when the portion where the contact length of the ground contact patch is short due to deformation in the direction where the tire radius increases extends in the circumferential direction. Further, although tension is readily applied to the wire such that metal fatigue occurs more easily in a pneumatic tire that provides a circumferential reinforcing layer than in a pneumatic tire having only a slanted belt layer, satisfying the above configuration can reduce metal fatigue. Further, when LZ/LC is not more than 1.0, tension in the wire in the circumferential reinforcing layer can be provided appropriately and can thereby suppress uneven wear in the tire. Specifically, the pneumatic tire can suppress the edge portion of the tire width direction of the circumferential reinforcing layer from becoming a portion having a long contact length, and can suppress the acceleration of wear due to increased surface pressure of the edge portion in the tire width direction of the circumferential reinforcing layer.

Note that the pneumatic tire that satisfies the range given above can be produced by adjusting the shape of the mold, the fill amount of rubber, the tension of each layer configuring the belt layer, rubber properties, arrangement of the belt and carcass relative to the mold, and the like at the time of production. Note that adjusting the various conditions given above also enables the contact length to be adjusted for the various positions described below and enables the pneumatic tire to be manufactured with a desired shape.

Further, the form of the ground contact patch S of the tread portion 40 is preferably such that $0.85 \leq L90/LC \leq 1.0$, where L90 is a ground contact length in the tire circumferential direction at a location (location that makes up the edge portion of W90 in the drawing) where the ground contact length is 90% of the maximum ground contact width W in the tire width direction, from the tire equatorial plane CL. In other words, the tread portion 40 is preferably a form in which the ground contact patch S satisfies $0.85 \leq L90/LC \leq 1.0$.

The pneumatic tire can form a suitable form for the ground contact patch and can suppress the partial unbalancing of loads at the time of contact by satisfying relationship given above between the contact length of the tire circumferential direction in the tire equatorial plane and contact length of the tire circumferential direction at the location (that makes up the edge portion of W90 in the drawing) where the ground contact length is 90% of the maximum ground contact width W in the tire width direction, from the tire equatorial plane CL. Therefore, uneven wear can be suppressed. Here, the location where the ground contact length is 90% of the maximum ground contact width W in the tire width direction, from the tire equatorial plane CL, is basically a shoulder portion of the pneumatic tire and is a region where uneven wear occurs easily. The pneumatic tire, by satisfying $0.85 \leq L90/LC$, can reduce the difference in the length of the tire radial direction between the location where the ground contact length is 90% of the maximum ground contact width W in the tire width direction, from the tire equatorial plane CL, and the contact length in the tire circumferential direction in the tire equatorial plane, can reduce slippage at the location where the ground contact length is 90% of the maximum ground contact width W in the tire width direction at the time of tire rotation, and can suppress the generation of uneven wear. In addition, the pneumatic tire, by satisfying L90/LC≤1.0, can suppress increases in surface pressure at the location where the ground contact length is 90% of the maximum ground contact width W in the tire width direction and can suppress the generation of uneven wear.

Further, the form of the ground contact patch S of the tread portion 40 is preferably such that 0.90≤L50/LC≤1.0, where L50 is a ground contact length in the tire circumferential direction at a location (location that makes up the edge portion of W50 in the drawing) where the ground contact length is 50% of the maximum ground contact width W in the tire width direction, from the tire equatorial plane CL. In other words, the tread portion 40 is preferably a form in which the ground contact patch S satisfies 0.90≤L50/LC≤1.0.

The pneumatic tire can form a suitable form for the ground contact patch and can suppress the partial unbalancing of loads at the time of contact by satisfying relationship given above between the contact length of the tire circumferential direction in the tire equatorial plane and contact length of the tire circumferential direction at the location (that makes up the edge portion of W50 in the drawing) where the ground contact length is 50% of the maximum ground contact width W in the tire width direction, from the tire equatorial plane CL. Therefore, uneven wear can be suppressed. The pneumatic tire, by satisfying 0.90≤L50/LC, can reduce the difference in the length of the tire radial direction between the location where the ground contact length is 50% of the maximum ground contact width W in the tire width direction, from the tire equatorial plane CL, and the contact length in the tire circumferential direction in the tire equatorial plane, can reduce slippage at the location where the ground contact length is 50% of the maximum ground contact width W in the tire width direction at the time of tire rotation, and can suppress the generation of uneven wear. In addition, the pneumatic tire, by satisfying L50/LC≤1.0, can suppress increases in surface pressure at the location where the ground contact length is 50% of the maximum ground contact width W in the tire width direction and can suppress the generation of uneven wear. In this way, a more detailed ground contact form can be specified and a form that can achieve the above effect more favorably can be obtained in the pneumatic tire by also specifying a form in the location where the ground contact length is 50% of the maximum ground contact width W in the tire width direction, from the tire equatorial plane CL.

Further, the form of the ground contact patch S of the tread portion 40 is preferably such that 0.95≤L98/L90≤1.05, where L98 is a ground contact length in the tire circumferential direction at a location (location that makes up the edge portion of W98 in the drawing) where the ground contact length is 98% of the maximum ground contact width W in the tire width direction, from the tire equatorial plane CL. In other words, the tread portion 40 is preferably a form in which the ground contact patch S satisfies 0.95≤L98/L90≤1.05.

The tread portion 40 can suppress both uneven wear due to step wear and uneven wear due to shoulder wear by the contact length satisfying the above range in two points on the outer side of the tire width direction. Specifically, step wear can be suppressed by L98/L90 being not less than 0.95, and shoulder wear can be suppressed by L98/L90 being not more than 1.05. Specifically, the pneumatic tire can reduce the contact length difference in the minus direction that occurs within a micro range of the shoulder portion by L98/L90 being not less than 0.95, and can suppress the generation of uneven wear (step wear) such as that generates a step in the tire radial direction. Further, the pneumatic tire can reduce the contact length difference in the plus direction that occurs within a micro range of the shoulder portion by L98/L90 being not more than 1.05, and can suppress the generation of wear in the shoulder portion.

Further, the circumferential reinforcing layer 145 of the belt layer 14 preferably has a width in the tire width direction that is not less than 60% and not more than 85% of the maximum ground contact width W. The inner-side cross belt 142, the outer-side cross belt 143 and the large angle belt 141 of the belt layer 14 are preferably configured of steel, the inclination angle relative to the tire circumferential direction is preferably not less than 10° and not greater than 70°, and the end count is preferably between 17 wires/50 mm to 30 wires/50 mm. Further, the inner-side cross belt 142 and the outer-side cross belt 143 preferably have at least one width in the tire width direction that is 80 to 95% of the maximum ground contact width W. The belt layer 14 can provide suitable strength and tension for the belt layer 14 by having various elements within the range given above, and can further increase durability of the pneumatic tire.

In addition, arranging the circumferential reinforcing layer 145 of the belt layer 14 between the pair of cross belts 142 and 143, enables the pneumatic tire 1 of the above embodiment further suitably improve the strength of the belt layer by the circumferential reinforcing layer 145. Further, because the belt layer 14 can achieve the above effect, as shown in the above embodiment, the circumferential reinforcing layer 145 is preferably arranged in a location interposed between the pair of cross belts 142 and 143 but is not limited to this. With the belt layer, it is sufficient that the circumferential reinforcing layer 145 be arranged further to the inner side in the tire radial direction than at least one of the pair of cross belts 142 and 143. For example, the circumferential reinforcing layer 145 in the belt layer may be arranged between the large angle belt 141 and the inner-side cross belt 142, or it may be arranged between the carcass layer 13 and the large angle belt 141.

Further, the circumferential reinforcing layer 145 of the above embodiment has a unitary structure, which is to say, is configured by a single wire wound in a spiral manner; but the embodiment is not limited to this. The circumferential reinforcing layer may be formed of a plurality of wires. Note that, when configuring the circumferential reinforcing layer by separating a plurality of wires, the location of the outermost side in a tire width direction becomes the edge portion of the circumferential reinforcing layer.

In addition, in the pneumatic tire 1, the circumferential reinforcing layer 145 is preferably disposed inward in the tire width direction of the left and right edge portions of the narrower cross belt 143 from among the pair of cross belts 142 and 143 as in this embodiment. Additionally, the width Wb of the narrower cross belt 143 and the distance s from the edge portion of the circumferential reinforcing layer 145 to the edge portion of the narrower cross belt 143 are more preferably in the range such that 0.03≤S/Wb.

In this embodiment, the outer-side cross belt 143 has a narrow width structure, and the circumferential reinforcing layer 145 is disposed inward in the tire width direction of the left and right edges of the outer-side cross belt 143. Also, the outer-side cross belt 143 and the circumferential reinforcing layer 145 are disposed so as to be left-right symmetric centered on the tire equatorial plane CL. According to this, in the pneumatic tire 1, the positional relationship s/Wb between the edge portion of the outer-side cross belt 143 and the edge portion of the circumferential reinforcing layer 145 is made appropriate so as to fall within the range given above for both left and right regions that demarcate the tire equatorial plane CL.

In this configuration, the positional relationship s/Wb of the edge portion of the cross belt 143 and the edge portion of the circumferential reinforcing layer 145 is made appropriate, and it is possible to reduce the strain that is produced in the rubber material around the circumferential reinforcing layer 145.

The width Wb and the distance s are measured as distances in the tire width direction in a cross sectional view in a tire meridian direction. Also, there is no upper limit to the value of s/Wb in particular, but it is restricted by the relationship of the width Ws of the circumferential reinforcing layer 145 and the width Wb of the narrower cross belt 143.

Also, the width Ws of the circumferential reinforcing layer 145 is set to be 0.6≤Ws/Wb. When the circumferential reinforcing layer 145 has a divided structure, the width Ws of the circumferential reinforcing layer 145 is the sum of the widths of each divided portion of the circumferential reinforcing layer 145.

Moreover, in the pneumatic tire 1, the wire that configures the circumferential reinforcing layer 145 is preferably steel wire, and the number of ends of the circumferential reinforcing layer 145 preferably is not less than 17 ends/50 mm and not more than 30 ends/50 mm. Moreover, the wire diameter is preferably within a range of not less than 1.2 mm and not more than 2.2 mm. The wire diameter is measured as the diameter of a circumscribed circle of the wire in a configuration in which the wire is configured by a plurality of twisted wire cords. According to this, keeping the wire diameter and the end count of the wire within the above ranges for the pneumatic tire 1 can appropriately maintain structure strength of the circumferential reinforcing layer 145 and further suitably improve durability of the pneumatic tire. In addition, the wire configuring the circumferential reinforcing layer 145 preferably uses a high elongation steel wire having an elongation of 2.0% to 3.5% when a tension load of between 150N and 200N is applied. Using a high elongation steel wire enables a better elongation ratio, when carrying a light load, than a normal steel wire, can withstand a load applied to the circumferential reinforcing layer applied from the time of manufacturing to the time of tire use, and can suppress damage to the circumferential reinforcing layer. Note that the high elongation steel wire having this favorable property has a measured value for elongation of 2.0% to 3.5% when a tension load is between 150N and 200N, in accordance with JISG 3510.

Moreover, the pneumatic tire 1 preferably has the nominal aspect ratio Sa within a range of Sa≤70. In addition, the pneumatic tire 1, as in this embodiment, is preferably used as a pneumatic tire for heavy loads, such as buses or trucks and the like. A pneumatic tire with a nominal aspect ratio Sa of Sa≤70, and in particular a heavy duty pneumatic tire for buses, trucks, and the like can demonstrate more improved performances such as durability by including the circumferential reinforcing layer, and furthermore, can demonstrate more improved tire durability by providing a structure in which the relationship between the contact lengths of each location of the ground contact patch satisfies the above range as in this embodiment.

EXAMPLES

In this embodiment, performance testing was performed for wire fatiguing durability (failure durability of the circumferential reinforcing layer) and for uneven wear durability by using various types of pneumatic tires under different conditions. Further, the pneumatic tire having a tire size of 445/50R22.5 is assembled onto a 22.5×14.00 inch rim and is inflated to an air pressure of 900 kPa which is the maximum air pressure for regular inner pressure.

The existence or absence of fatigue failure of the wire for the wire fatigue durability was verified using a laboratory drum test where a load of 140% of the standard maximum load was run for 10,000 km at a running speed of 45 km/h and an SA of ±2° and observing the state of the circumferential reinforcing layer after running has completed.

For uneven wear durability, the pneumatic tire was mounted on the rear axle of a tractor head and uneven wear was verified after running 70,000 miles and using the uneven wear performance of the comparative example 1 as 100, the uneven wear performance was standardized. Note that, in the uneven wear performance, a smaller numerical value indicates less uneven wear and higher uneven wear durability, and a larger numerical value indicates more uneven wear and lower uneven wear durability. In addition, for uneven wear performance, when a value is greater than 102, it can be determined that the uneven wear durability is decreased relative to comparative example 1, and when a value is 102, it can be determined that the uneven wear durability is no worse relative to comparative example 1. In other words, for uneven wear performance, the allowable range is 102, and if the value is not more than 99, it can be determined that there is an improvement in uneven wear performance.

The conditions for each pneumatic tire and their evaluation results are given below in Tables 1, 2, and 3.

TABLE 1

|  | Comparative Example 1 | Comparative Example 2 | Comparative Example 3 | Comparative Example 4 |
| --- | --- | --- | --- | --- |
| LZ/LC | 0.82 | 0.84 | 0.89 | 1.01 |
| L90/LC | 0.93 | 1.08 | 0.93 | 1.05 |
| L50/LC | 0.80 | 0.92 | 0.94 | 1.10 |
| L98/L90 | 0.84 | 0.98 | 0.90 | 1.10 |
| Fatigue failure | Present | Present | Present | Absent |
| Uneven wear performance | 100 | 99 | 99 | 104 |

TABLE 2

|  | Working Example 1 | Working Example 2 | Working Example 3 | Working Example 4 | Working Example 5 | Working Example 6 |
| --- | --- | --- | --- | --- | --- | --- |
| LZ/LC | 0.90 | 0.99 | 1.00 | 0.95 | 0.94 | 0.95 |
| L90/LC | 0.84 | 0.85 | 1.10 | 1.00 | 0.92 | 1.01 |
| L50/LC | 0.89 | 1.10 | 1.10 | 0.98 | 0.94 | 1.02 |
| L98/L90 | 0.90 | 1.01 | 1.06 | 0.95 | 1.05 | 1.06 |
| Fatigue failure | Absent | Absent | Absent | Absent | Absent | Absent |
| Uneven wear performance | 102 | 96 | 102 | 95 | 95 | 102 |

TABLE 3

|  | Working Example 7 | Working Example 8 | Working Example 9 | Working Example 10 | Working Example 11 | Working Example 12 |
|---|---|---|---|---|---|---|
| LZ/LC | 0.94 | 0.94 | 0.95 | 0.94 | 0.95 | 0.95 |
| L90/LC | 0.95 | 1.01 | 0.92 | 1.01 | 0.98 | 1.01 |
| L50/LC | 0.88 | 0.98 | 0.90 | 1.01 | 1.01 | 1.00 |
| L98/L90 | 0.94 | 0.94 | 0.94 | 0.98 | 1.00 | 1.00 |
| Fatigue failure | Absent | Absent | Absent | Absent | Absent | Absent |
| Uneven wear performance | 99 | 101 | 98 | 99 | 96 | 98 |

As indicated in Table 1, fatigue failure of the wire occurs in the pneumatic tire in comparative example 1 at the edge portion of the circumferential reinforcing layer. Further, step wear occurs in the pneumatic tire in comparative example 1 at the edge portion of the shoulder. Also, fatigue failure of the wire occurs in the pneumatic tire in comparative example 2 at the edge portion of the circumferential reinforcing layer. Although shoulder wear occurred in the pneumatic tire in comparative example 2, uneven wear durability improved to a certain degree over that in comparative example 1. Also, fatigue failure occurred in the pneumatic tire in comparative example 3 similarly to the pneumatic tire in comparative example 1 and the pneumatic tire in comparative example 2. Note that uneven wear durability in the pneumatic tire in comparative example 3 improved to a certain degree over that in the pneumatic tire in comparative example 1. Also, although fatigue failure did not occur in the pneumatic tire in comparative example 4, uneven wear performance worsened.

As shown in Table 1 and 2, the amount of uneven wear is reduced in the pneumatic tires of working examples 1 to 12 and uneven wear durability is improved. In the pneumatic tires of working examples 1 to 12, it is evident that wire fatigue durability is improved because fatigue failure of the wire did not occur even under severe testing conditions. According to the above, it is evident that the durability in the pneumatic tires of working examples 1 to 12 is improved.

What is claimed is:

1. A pneumatic tire comprising: a belt layer including a pair of cross belts and a circumferential reinforcing layer disposed between the cross belts or disposed inward in the tire radial direction of the cross belts and that comprises a steel wire wound spirally at a slant within a ±5° range with respect to a tire circumferential direction, and
a tread portion disposed outward in the tire radial direction of the belt layer and that contacts a road surface; wherein
when assembled on a regular rim, inflated to a maximum air pressure of a regular inner pressure, provided with a camber angle of 0°, and subjected to 100% of a regular load, a form of a ground contact patch of the tread portion is such that 0.9<LZ/LC<1.0, where LC is a ground contact length in the tire circumferential direction on a tire equatorial plane and LZ is a ground contact length in the tire circumferential direction of an edge in a tire width direction of the circumferential reinforcing layer;
the circumferential reinforcing layer has a width in the tire width direction that is not less than 60% and not more than 85% of a maximum ground contact width in the tire width direction of the ground contact patch of the tread portion; and
a form of the ground contact patch of the tread portion is such that 0.95<L98/L90<1.05, where L90 is a ground contact length in the tire circumferential direction at a location where the ground contact length is 90% of the maximum ground contact width in the tire width direction, from the tire equatorial plane; and L98 is a ground contact length in the tire circumferential direction at a location where the ground contact length is 98% of the maximum ground contact width in the tire width direction, from the tire equatorial plane.

2. A pneumatic tire, comprising:
a belt layer including a pair of cross belts and a circumferential reinforcing layer disposed between the cross belts or disposed inward in the tire radial direction of the cross belts and that comprises a steel wire wound spirally at a slant within a ±5° range with respect to a tire circumferential direction, and
a tread portion disposed outward in the tire radial direction of the belt layer and that contacts a road surface; wherein
when assembled on a regular rim, inflated to a maximum air pressure of a regular inner pressure, provided with a camber angle of 0°, and subjected to 100% of a regular load, a form of a ground contact patch of the tread portion is such that 0.9<LZ/LC<1.0, where LC is a ground contact length in the tire circumferential direction on a tire equatorial plane and LZ is a ground contact length in the tire circumferential direction of an edge in a tire width direction of the circumferential reinforcing layer;
the circumferential reinforcing layer has a width in the tire width direction that is not less than 60% and not more than 85% of a maximum ground contact width in the tire width direction of the ground contact patch of the tread portion; and
a form of the ground contact patch of the tread portion is such that 0.85<L90/LC<1.0, where L90 is a ground contact length in the tire circumferential direction at a location where the ground contact length is 90% of the maximum ground contact width in the tire width direction, centered on the tire equatorial plane.

3. A pneumatic tire, comprising:
a belt layer including a pair of cross belts and a circumferential reinforcing layer disposed between the cross belts or disposed inward in the tire radial direction of the cross belts and that comprises a steel wire wound spirally at a slant within a ±5° range with respect to a tire circumferential direction, and
a tread portion disposed outward in the tire radial direction of the belt layer and that contacts a road surface; wherein
when assembled on a regular rim, inflated to a maximum air pressure of a regular inner pressure, provided with a camber angle of 0°, and subjected to 100% of a regular load, a form of a ground contact patch of the tread portion is such that 0.9<LZ/LC<1.0, where LC is a ground contact length in the tire circumferential direction on a tire equatorial plane and LZ is a ground contact length in the tire circumferential direction of an edge in a tire width direction of the circumferential reinforcing layer;

the circumferential reinforcing layer has a width in the tire width direction that is not less than 60% and not more than 85% of a maximum ground contact width in the tire width direction of the ground contact patch of the tread portion; and a form of the ground contact patch of the tread portion is such that $0.90<L50/LC<1.0$, where L50 is a ground contact length in the tire circumferential direction at a location where the ground contact length is 50% of the maximum ground contact width in the tire width direction, centered on the tire equatorial plane.

4. The pneumatic tire according to claim 1, wherein the circumferential reinforcing layer of the belt layer is disposed between the pair of cross belts.

5. The pneumatic tire according to claim 1, wherein a nominal aspect ratio of the tire is not more than 70.

6. The pneumatic tire according to claim 1, wherein the steel wire is disposed with an end count of not less than 17 wires/50 mm and not more than 30 wires/50 mm.

7. The pneumatic tire according to claim 1, wherein a diameter of the steel wire is within a range of not less than 1.2 mm and not more than 2.2 mm.

8. The pneumatic tire according to claim 2, wherein the form of the ground contact patch of the tread portion is such that $0.90<L50/LC<1.0$, where L50 is a ground contact length in the tire circumferential direction at a location where the ground contact length is 50% of the maximum ground contact width in the tire width direction, from the tire equatorial plane.

9. The pneumatic tire according to claim 2, wherein the form of the ground contact patch of the tread portion is such that $0.95<L98/L90<1.05$, where L90 is a ground contact length in the tire circumferential direction at a location where the ground contact length is 90% of the maximum ground contact width in the tire width direction, from the tire equatorial plane; and L98 is a ground contact length in the tire circumferential direction at a location where the ground contact length is 98% of the maximum ground contact width in the tire width direction, from the tire equatorial plane.

10. The pneumatic tire according to claim 2, wherein the circumferential reinforcing layer of the belt layer is disposed between the pair of cross belts.

11. The pneumatic tire according to claim 2, wherein a nominal aspect ratio of the tire is not more than 70.

12. The pneumatic tire according to claim 2, wherein the steel wire is disposed with an end count of not less than 17 wires/50 mm and not more than 30 wires/50 mm.

13. The pneumatic tire according to claim 2, wherein a diameter of the steel wire is within a range of not less than 1.2 mm and not more than 2.2 mm.

14. The pneumatic tire according to claim 3, wherein the form of the ground contact patch of the tread portion is such that $0.95<L98/L90<1.05$, where L90 is a ground contact length in the tire circumferential direction at a location where the ground contact length is 90% of the maximum ground contact width in the tire width direction, from the tire equatorial plane; and L98 is a ground contact length in the tire circumferential direction at a location where the ground contact length is 98% of the maximum ground contact width in the tire width direction, from the tire equatorial plane.

15. The pneumatic tire according to claim 3, wherein the circumferential reinforcing layer of the belt layer is disposed between the pair of cross belts.

16. The pneumatic tire according to claim 3, wherein a nominal aspect ratio of the tire is not more than 70.

17. The pneumatic tire according to claim 3, wherein the steel wire is disposed with an end count of not less than 17 wires/50 mm and not more than 30 wires/50 mm.

18. The pneumatic tire according to claim 3, wherein a diameter of the steel wire is within a range of not less than 1.2 mm and not more than 2.2 mm.

19. The pneumatic tire according to claim 1, wherein the pneumatic tire is a pneumatic tire for heavy duty.

* * * * *